(12) United States Patent
Rastas

(10) Patent No.: US 7,904,058 B2
(45) Date of Patent: Mar. 8, 2011

(54) RECORDING DATA AT A MOBILE TELEPHONE DURING A TELEPHONE CALL

(75) Inventor: Timo Rastas, Helsinki (FI)

(73) Assignee: Nokia Corporation, Espoo (FI)

( * ) Notice: Subject to any disclaimer, the term of this patent is extended or adjusted under 35 U.S.C. 154(b) by 639 days.

(21) Appl. No.: 11/660,123

(22) PCT Filed: Oct. 22, 2004

(86) PCT No.: PCT/IB2004/003625
§ 371 (c)(1),
(2), (4) Date: Apr. 7, 2008

(87) PCT Pub. No.: WO2006/043128
PCT Pub. Date: Apr. 27, 2006

(65) Prior Publication Data
US 2008/0293383 A1 Nov. 27, 2008

(51) Int. Cl.
*H04M 1/725* (2006.01)
*H04M 3/42* (2006.01)
*H04L 12/58* (2006.01)
*H04M 1/00* (2006.01)
*H04M 1/64* (2006.01)
*H04B 1/38* (2006.01)

(52) U.S. Cl. .................. 455/412.1; 455/414.1; 455/415; 455/566; 455/567; 379/85

(58) Field of Classification Search ............. 455/412.1, 455/414.1, 415, 566, 567; 379/67.1, 68, 379/85
See application file for complete search history.

(56) References Cited

U.S. PATENT DOCUMENTS

| | | | | |
|---|---|---|---|---|
| 5,974,388 | A * | 10/1999 | Durham | 705/1.1 |
| 5,995,824 | A | 11/1999 | Whitfield | 455/412 |
| 6,604,079 | B1 * | 8/2003 | Ruvolo et al. | 705/1.1 |
| 6,690,950 | B2 * | 2/2004 | Takagi et al. | 455/558 |
| 7,096,009 | B2 * | 8/2006 | Mousseau et al. | 455/415 |
| 2004/0161082 | A1 | 8/2004 | Brown et al. | 379/93.21 |
| 2006/0217967 | A1 * | 9/2006 | Goertzen et al. | 704/201 |

FOREIGN PATENT DOCUMENTS
EP 1 178 651 A2 2/2002
EP 1 209 932 A2 5/2002
* cited by examiner

*Primary Examiner* — Un C Cho
(74) *Attorney, Agent, or Firm* — Harrington & Smith

(57) ABSTRACT

A method for recording data at a mobile telephone during a telephone call between a user of the mobile telephone and a participant, including enabling a user to record first data during the telephone call; augmenting the first data with second data that identifies the participant, without user input of the second data; and storing the augmented first data.

22 Claims, 2 Drawing Sheets

RECORDING DATA AT A MOBILE TELEPHONE DURING A TELEPHONE CALL

FIELD OF THE INVENTION

Embodiments of the invention relate to methods, devices and computer programs for recording data at a mobile telephone during a telephone call.

BACKGROUND TO THE INVENTION

There is a current trend towards making mobile telephones smaller while increasing their functionality. As a consequence, the need for inputting and recording data at the mobile telephone generally increases but so does the difficulty associated with inputting the data as the keypad size decreases.

BRIEF DESCRIPTION OF THE INVENTION

According to one embodiment of the invention there is provided a method for recording data at a mobile telephone during a telephone call between a user of the mobile telephone and a participant, comprising: enabling a user to record first data during the telephone call; augmenting the first data with second data that identifies the participant, without user input of the second data; and storing the augmented first data.

According to another embodiment of the invention there is provided a mobile telephone for recording data during a telephone call between a user of the mobile telephone and a participant, the mobile telephone comprising: a user input device for enabling a user to record first data during the telephone call; a processor operable to augment the first data with second data that identifies the participant, without user input of the second data; and a memory for storing the data.

According to another embodiment of the invention there is provided a computer program comprising program instructions which when loaded into a processor provide: means for augmenting first data, recorded by a local user during the telephone call between the local user and a remote participant, with second data that identifies the remote participant, without user input of the second data; and means for storing the augmented first data.

According to another embodiment of the invention there is provided a graphical user interface comprising: an option for enabling a mobile telephone to record during the telephone call first data for augmentation with second data that identifies a remote participant in the telephone call, without user input of the second data.

BRIEF DESCRIPTION OF THE DRAWINGS

For a better understanding of the present invention reference will now be made by way of example only to the accompanying drawings in which:

FIG. 1 illustrates a mobile cellular telecommunications system 2 that

DETAILED DESCRIPTION OF EMBODIMENTS OF THE INVENTION

Figure 1:
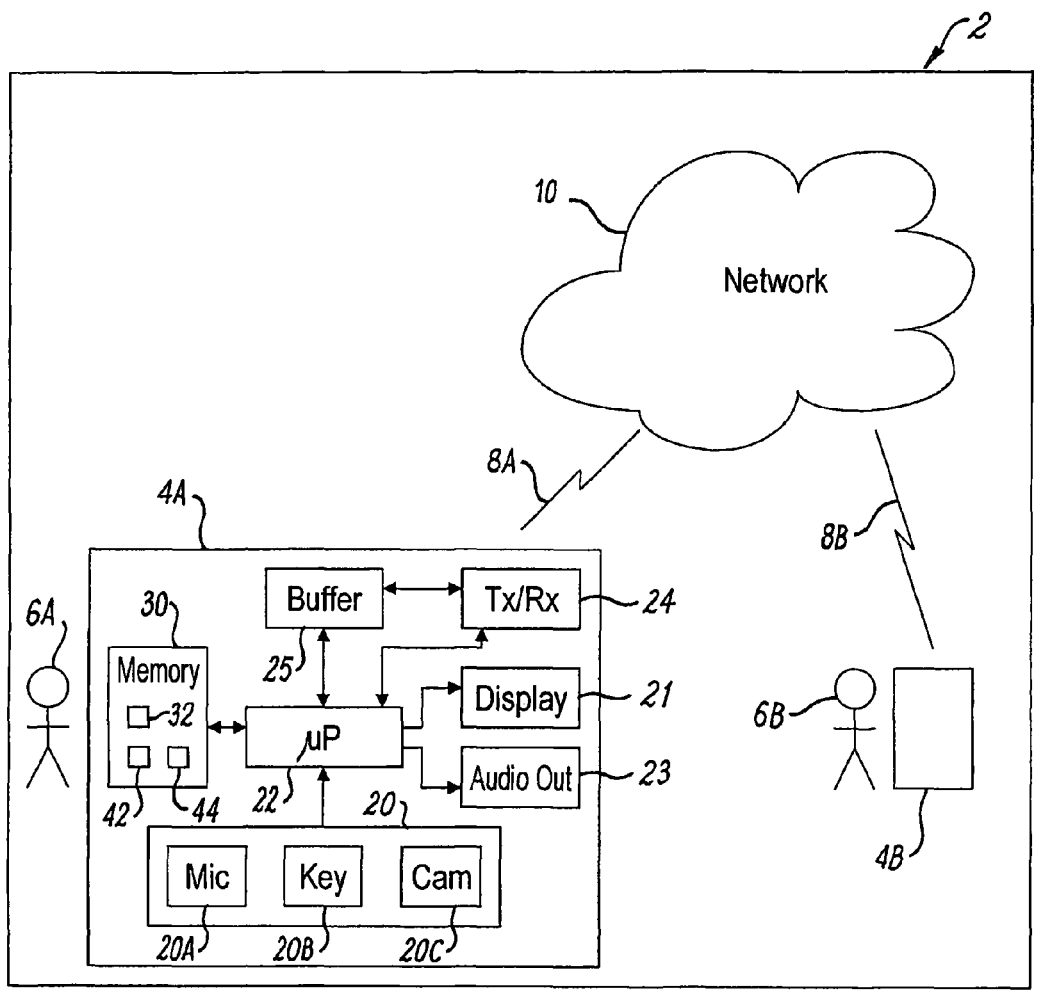

FIG. 1 illustrates a mobile cellular telecommunications system 2 that comprises a network 10, a mobile cellular telephone terminal 4A and a terminal 4B. A user 6A uses the cellular telephone 4A to participate in a telephone conversation with another person, the participant 6B who is using the terminal 4B. The telephone call is established via a radio link 8A between the mobile cellular telephone 4A and the network 10, through the network 10 and then via a radio link 8B between the terminal 4B and the network 10.

The term 'telephone call' should be interpreted in a broad sense. It is intended to mean an on-going connection in which information is exchanged between the user 6A and the participant 6B or between the mobile telephone 4A and the terminal 4B. The information may be speech or data.

Although the terminal 4B is illustrated as a radio terminal, it may alternatively be a fixed line terminal, for example in the Plain Old Telephone Network (POTN).

The mobile telephone 4A enables the recording of data during a telephone call between the user 6A of the mobile telephone 4A and the participant 6B. The user is able to record, during the telephone call, first data, which may, for example, be a sound recording of the telephone call conversation, alphanumeric text input by the user, a photograph taken by the user etc. The mobile telephone 4A is operable to augment the first data with second data that identifies the participant 4B, without user input of the second data and to store the augmented data. The second data may identify the participant by, for example, name or telephone number.

The mobile telephone 4A illustrated in more detail in FIG. 1. The mobile telephone is, in this example, a hand-portable device that comprises: a user input device 20, a display 21, a processor 22, a memory 30, an audio output device 23 and a radio transceiver 24. The processor 22 is connected to receive input commands from the user input device 20, to read from and write to the memory 30. The processor 22 is also connected to send and receive information via the radio transceiver 24. The processor is also connected to control the display 21 and audio output device 23.

Although only a single processor has been illustrated it will be appreciated that the term 'processor' is intended to encompass one or more discrete microprocessors, controllers, chipsets etc.

The radio transceiver 24 is used in the formation of the radio link 8A and the establishment, maintenance and termination of the telephone call.

The user input device 20 enables the user 6A to record first data during the telephone call. The user input device 20 may itself record the first data. It may, for example, be a microphone 20A for recording audio data such as dictated speech, a keypad 20B for recording alphanumeric text or a camera 20C for recording an image. The user input device 20 may alternatively or additionally be used to control the recording of data. It may, for example, be used to initiate the recording of the telephone call conversation content as audio data.

Figure 2:
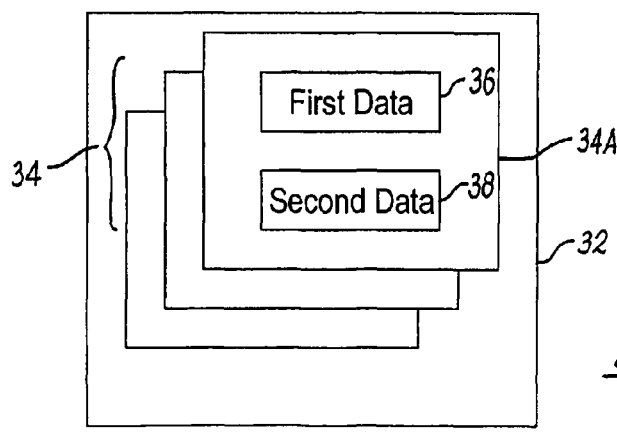
FIG. 2 illustrates a database for augmenting the first data with the second data.

The memory 30 comprises a data structure 32 for storing the first and second data. In this example the data structure 32 is database as illustrated in FIG. 2. The database 32 has a plurality of records 34. The record 34A has one or more first fields 36 for recording the first data and a second field 38 for recording the second data.

The memory 30, in this example, also comprises another data structure—a Contacts database 42. The Contacts database 42 associates each one of a plurality of identifiers with a different data entity. An identifier may correspond to the whole or part of a telephone number with the associated data entity being text corresponding to the name/moniker of a person who uses that telephone number.

The processor 22 is operable to write data to a second field 38 of a record 34A without receiving a user command to do so from the user input device 20. This data may be obtained by automatically querying the Contacts database with a received identifier. The Contacts database automatically returns the data entity associated with the received identifier, if any. Thus the processor 22 augments the first data recorded in the record 34A with second data that identifies the participant, without user input of the second data.

The identifier may be received at the processor 22 from a buffer 25 associated with the radio transceiver 24. This buffer acts as a 'last call made' buffer if the mobile telephone 4A initiated the telephone call. The buffer 25, in this instance, stores the telephone number dialed to initiate the telephone call. This buffer acts as a 'last call received' buffer if the mobile terminal 4A terminates the telephone call, which was initiated by the terminal 4B. The buffer 25, in this instance, stores the telephone number identified, via call line identification (CLI) or its equivalent, when the telephone call was initially started. In CLI, the paging signal that indicates to the mobile telephone 4A that there is an incoming telephone call contains the telephone number of the participant 6B. The mobile telephone 4A is able to display this telephone number or the data entity associated with it in the Contacts database before the user 6A accepts the telephone call.

Figure 3:
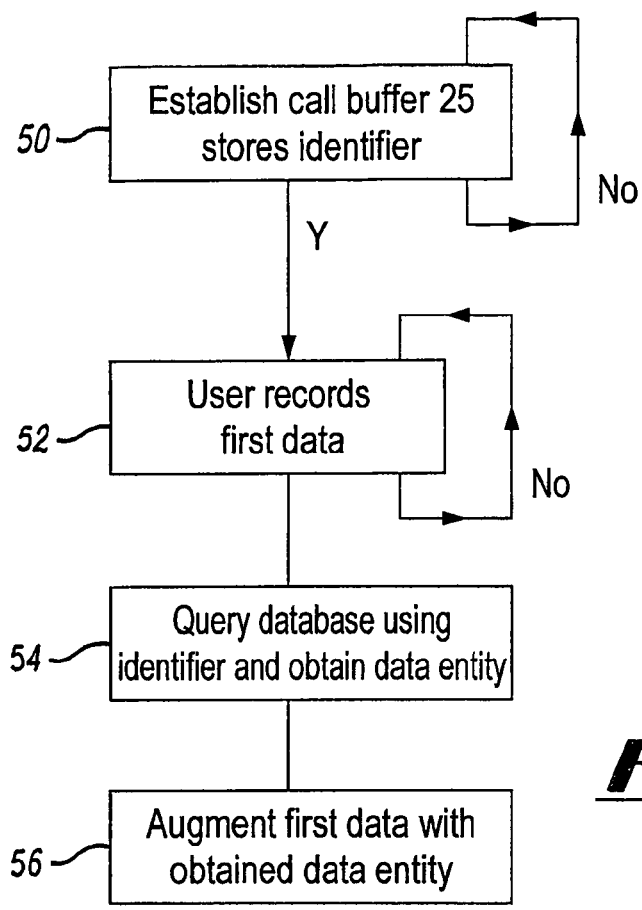
FIG. 3 illustrates in schematic form a method for carrying out one embodiment of the invention.

FIG. 3 illustrates in schematic form a method for carrying out one embodiment of the invention.

At step 50 a telephone call is established and the buffer 25 stores the telephone number of the participant 6B.

Then at step 52, the user records first data, in a first field 36 of a record 34A in the database 32

Then at step 54, the processor 22 automatically uses the telephone number to query the Contacts database 42. The Contacts database 42 automatically returns the name of the participant, which is the data entity associated with the telephone number used to query the Contacts database 42.

Then at step 56, the processor automatically updates the first record 34A of the database 32 by storing the returned data entity in the second field 38 of the first record 34A.

In one application of the invention, the database record 34A is an appointment in a calendar and the first field 36 includes one or more of the date, time, location, subject of the appointment and the second field 38 includes an attendee or the attendees at the appointment. This information may be stored as alphanumeric text data that is either input as text or converted to text from input speech. In this scenario, the processor 22 may automatically record in the second field 38 not only the return data entity but also the name of the user 4A.

Figure 4:
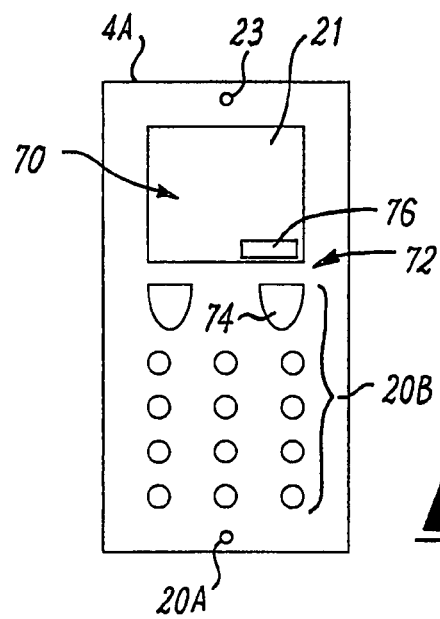
FIG. 4 illustrates a graphical user interface.

As the creation of an appointment is a frequent occurrence during a telephone call, the graphical user interface of the mobile telephone may be adapted to facilitate use of the invention. The graphical user interface 70 illustrated in FIG. 4 presents a user-selectable option 72, which when selected enables the user 6A to record first data at step 52 of the method illustrated in FIG. 3. Typically, the option will be associated with a programmable or 'soft' key 74. These keys are generally positioned adjacent the display 21 and the function of the key is indicated by a legend 76 displayed near the key on the display 21. As the function of the key changes, for example as the menu of the telephone is navigated or the state of the telephone changes, then the legend 76 changes to indicate the new function. In one embodiment, when a telephone call is established a soft key 74 of the mobile telephone 4A can be used to make a new appointment entry during the call. The associated legend 76 may be 'appointment'. When this softkey 74 is selected during the telephone call, the mobile telephone enables the microphone 20A and voice recognition software. The user 6A then dictates the details of the appointment, which are converted to text by the voice recognition software and stored as the first data (step 52), the steps 54 and 56 then follow as described with reference to FIG. 3. Depending upon implementation the jump from step 52 to 54 and from 54 to 56 may be fully or semi automatic. If fully automatic, the jumps occur without user interaction. If semiautomatic, a user confirmation is required before the jump is made.

In another application of the invention, the database record 34A is a document and the first field 36 includes text, an image or an audio file and the content of the second field 38 references the document. Typically, the content of the second field functions as metadata and is used to search for or reference the document.

In another application of the invention, the database record 34A is a document and the first field 36 includes a record of the call conversation and the content of the second field 38 references the document. Typically, the content of the second field functions as metadata and is used to search for or reference the document.

In the foregoing described examples, a database 42 has been used to convert the identifier into second data.

In an alternative implementation the identifier itself may be used as the second data. The identifier may be the telephone number of the participant or data sent by the terminal 4B to the telephone 4A during or in connection with the telephone call.

The memory 30 additionally stores a computer program 44. The computer program 44 comprises computer program instructions which when loaded into the processor 22, control the operation of the processor 22 and at least steps 52, 54 and 56 of the method illustrated in FIG. 3. The combination of processor 22 and program 44 provide means for augmenting first data, recorded by a local user during the telephone call between the local user and a remote participant, with second data that identifies the remote participant, without user input of the second data; and means for storing the augmented first data. The computer program 44 may be transferred to the memory 30 via a computer readable medium 46 embodying the computer program such as a record carrier, memory device, floppy disc, DVD etc.

Although embodiments of the present invention have been described in the preceding paragraphs with reference to various examples, it should be appreciated that modifications to the examples given can be made without departing from the spirit and scope of the invention.

I claim:

1. A method, comprising:
   enabling a user of a mobile telephone to record first data during a telephone call between the user of the mobile telephone and a participant;
   augmenting the first data with second data that is at least one of data received during the telephone call and data derived from information received during the telephone call, where the second data identifies the participant, and where augmenting is performed without user input of the second data; and
   storing the augmented first data;
   where the augmented first data is a database record having at least one first field comprising the first data and a second field comprising the second data, and
   where the database record is an appointment in a calendar and the at least one first field comprises at least one of the date, time, location and subject of the appointment and the second field comprises an attendee at the appointment.

2. The method as claimed in claim 1, wherein the second data additionally identifies the user.

3. The method as claimed in claim 1, wherein the step of enabling enables the user to record text, as first data, during the telephone call.

4. The method as claimed in claim 1, wherein the step of enabling enables the user to record speech, as first data, during the telephone call.

5. The method as claimed in claim 1, wherein the second data comprises text identifying a name of the participant.

6. The method as claimed in claim 1, wherein the first field includes a sound recording from the telephone call and the second field references the sound recording.

7. The method as claimed in claim 1, wherein the first field includes a text entry and the second field references the text entry.

8. The method as claimed in claim 1, wherein the first data is automatically augmented with the second data without user intervention.

9. The method as claimed in claim 1, further comprising receiving, as a consequence of the telephone call, an identifier that identifies the participant and which is used to augment the first data with the second data.

10. The method as claimed in claim 9, wherein the received identifier comprises the second data.

11. The method as claimed in claim 9, further comprising:
associating each one of a plurality of identifiers with a different data entity,
and using the received identifier to automatically obtain the data entity associated with the identifier corresponding to the received identifier and using the obtained data entity as the second data.

12. The method as claimed in claim 11, wherein the received identifier is a telephone number.

13. The method of claim 1, where enabling the user to record first data comprises, in response to the user selecting a record function, enabling a microphone and voice recognition software to respond to the user dictating details of the appointment by converting the user's voice to text and storing the text as the first data.

14. An apparatus, comprising:
a processor; and
a memory including computer program code, where the memory and computer program code are configured to, with the processor, cause the apparatus at least to,
enable a user of a mobile telephone to record first data during a telephone call between the user of the mobile telephone and a participant;
augment, without user input of second data, the first data with the second data, where the second data is at least one of data received during the telephone call and data derived from information received during the telephone call, where the second data identifies the participant; and
store the augmented first data;
where the augmented first data is a database record having at least one first field comprising the first data and a second field comprising the second data, and
where the database record is an appointment in a calendar and the at least one first field comprises at least one of the date, time, location and subject of the appointment and the second field comprises an attendee at the appointment.

15. The apparatus as claimed in claim 14, wherein the user input device enables the user to record text, as first data, during the telephone call.

16. The apparatus as claimed in claim 14, wherein the user input device enables the user to record speech, as first data, during the telephone call.

17. The apparatus as claimed in claim 14, wherein the second data additionally identifies the user.

18. The apparatus as claimed in claim 15, wherein the second data comprises text identifying a name of the participant.

19. The apparatus of claim 14, where the user is enabled to record first data by, in response to the user selecting a record function, enabling a microphone and voice recognition software to respond to the user dictating details of the appointment by converting the user's voice to text and storing the text as the first data.

20. A graphical user interface comprising:
an option for enabling a mobile telephone to record during a telephone call first data for augmentation with second data that identifies a remote participant in the telephone call, without user input of the second data, and to store the augmented first data;
where the second data is at least one of data received during the telephone call and data derived from information received during the telephone call;
where the augmented first data is a database record having at least one first field comprising the first data and a second field comprising the second data, and
where the database record is an appointment in a calendar and the at least one first field comprises at least one of the date, time, location and subject of the appointment and the second field comprises an attendee at the appointment,
and where said graphical user interface comprises at least one control indicating a record function that operates, in response to the user selecting the record function, to enable a microphone and voice recognition software to respond to the user dictating details of the appointment by converting the user's voice to text and storing the text as the first data.

21. A non-transitory computer-readable medium that contains software program instructions, where execution of the software program instructions by at least one data processor results in performance of operations that comprise:
enabling a user of a mobile telephone to record first data during a telephone call between the user of the mobile telephone and a participant;
augmenting the first data with second data that is at least one of data received during the telephone call and data derived from information received during the telephone call, where the second data identifies the participant, and where augmenting is performed without user input of the second data; and
storing the augmented first data;
where the augmented first data is a database record having at least one first field comprising the first data and a second field comprising the second data, and
where the database record is an appointment in a calendar and the at least one first field comprises at least one of the date, time, location and subject of the appointment and the second field comprises an attendee at the appointment.

22. The non-transitory computer-readable medium of claim 21, where enabling the user to record first data comprises, in response to the user selecting a record function, enabling a microphone and voice recognition software to respond to the user dictating details of the appointment by converting the user's voice to text and storing the text as the first data.

* * * * *